US012755076B2

(12) United States Patent
Sun et al.

(10) Patent No.: US 12,755,076 B2
(45) Date of Patent: Oct. 6, 2026

(54) HEAT SUPPLY NETWORK HYDRAULIC CIRCUIT MODELING METHOD FOR COMPREHENSIVE ENERGY SYSTEM SCHEDULING

(71) Applicant: TSINGHUA UNIVERSITY, Beijing (CN)

(72) Inventors: Hongbin Sun, Beijing (CN); Qinglai Guo, Beijing (CN); Bin Wang, Beijing (CN); Binbin Chen, Beijing (CN); Zhaoguang Pan, Beijing (CN); Wenchuan Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 1081 days.

(21) Appl. No.: 17/892,172

(22) Filed: Aug. 22, 2022

(65) Prior Publication Data

US 2022/0405449 A1 Dec. 22, 2022

Related U.S. Application Data

(63) Continuation of application No. PCT/CN2021/070697, filed on Jan. 7, 2021.

(30) Foreign Application Priority Data

Feb. 22, 2020 (CN) ......................... 202010109315.5

(51) Int. Cl.

*G06F 30/28* (2020.01)
*G06F 111/10* (2020.01)
*G06F 113/08* (2020.01)

(52) U.S. Cl.

CPC .......... *G06F 30/28* (2020.01); *G06F 2111/10* (2020.01); *G06F 2113/08* (2020.01)

(58) Field of Classification Search

CPC .. G06F 30/28; G06F 2111/10; G06F 2113/08; G06F 30/18; G06F 2113/14; G06F 2119/08; G06F 2119/14

See application file for complete search history.

(56) References Cited

U.S. PATENT DOCUMENTS

| | | | |
|---|---|---|---|
| 2014/0156094 | A1 | 6/2014 | Trias |
| 2015/0261893 | A1 | 9/2015 | Yu et al. |
| 2018/0268083 | A1 | 9/2018 | Chainer et al. |

FOREIGN PATENT DOCUMENTS

| | | | |
|---|---|---|---|
| CN | 107563674 | A | 1/2018 |
| CN | 107808218 | A | 3/2018 |

(Continued)

OTHER PUBLICATIONS

S.L Ke, H.C Ti, Transient analysis of isothermal gas flow in pipeline network, Chemical Engineering Journal, vol. 76, Issue 2, 2000, pp. 169-177, ISSN 1385-8947, https://doi.org/10.1016/S1385-8947(99)00122-9. (https://www.sciencedirect.com/science/article/pii/S1385894799001229) (Year: 2000).*

(Continued)

*Primary Examiner* — Rehana Perveen
*Assistant Examiner* — Narciso Eduardo Montes

(57) ABSTRACT

A heat supply network hydraulic circuit modeling method for a comprehensive energy system scheduling is provided. The hydraulic analysis model is unified with the power network model, and the connection between the hydraulic dynamic state and the hydraulic steady state is established. Based on the characteristic equations of thermal pipelines, flow control valves and compressors, this method abstracts hydraulic circuit element models such as hydraulic resistance, hydraulic inductance, and hydraulic pressure source, establishes hydraulic branch characteristics of the heat supply network based on the above hydraulic circuit elements, establishes the hydraulic topology constraints of the heat (Continued)

supply network based on Kirchhoff-like voltage and current laws, and establishes the steady hydraulic network equation by combining the above hydraulic branch characteristics and hydraulic topology constraints.

1 Claim, 1 Drawing Sheet

(56) References Cited

FOREIGN PATENT DOCUMENTS

| | | | | | |
|---|---|---|---|---|---|
| CN | 107817681 A | | 3/2018 | | |
| CN | 107871058 A | | 4/2018 | | |
| CN | 108596453 A | * | 9/2018 | ............ | G06Q 50/06 |
| CN | 108629462 A | | 10/2018 | | |
| CN | 109255466 A | | 1/2019 | | |
| CN | 109697308 A | | 4/2019 | | |
| CN | 109726483 A | | 5/2019 | | |
| CN | 110263387 A | | 9/2019 | | |
| CN | 110543609 A | | 12/2019 | | |
| CN | 110765622 A | * | 2/2020 | | |
| CN | 111414721 A | | 7/2020 | | |
| WO | WO-2018196456 A1 | * | 11/2018 | ............ | G05B 17/02 |

OTHER PUBLICATIONS

Xu, Chen, et al. Hydraulic Modeling of Large District Energy Systems for Planning Purposes. Sep. 2007. www.aivc.org, https://www.aivc.org/resource/hydraulic-modeling-large-district-energy-systems-planning-purposes. (Year: 2007).*

Ling Hao, Fei Xu, Qun Chen, Mingshan Wei, Lei Chen, Yong Min, A thermal-electrical analogy transient model of district heating pipelines for integrated analysis of thermal and power systems, Applied Thermal Engineering, vol. 139, 2018, pp. 213-221, ISSN 1359-4311 (Year: 2018).*

International Search Report in International Application No. PCT/CN2021/070697, dated Apr. 6, 2021.

Chen, Binbin et al., "Energy Circuit Theory of Integrated Energy System Analysis (I): Gaseous Circuit", Proceedings of the CSEE, Jan. 20, 2020, vol. 40, No. 2, pp. 436-443, DOI: 10.13334/j.0258-8013.pcsee.200028.

The First Office Action in counterpart China Application No. 202010109315.5, dated Aug. 4, 2021.

Zheng Qiao et al., "Static voltage stability margin considering the coupling of natural gas and power system", 2018 IEEE Power & Energy Society General Meeting (PESGM), Dec. 24, 2018.

Sun, Hongbin et al., "Integrated Energy Management System With Multi-Energy Flow For Energy Internet : Design and Application", Automation of Electric Power Systems, vol. 43, No. 12, pp. 122-128, Jun. 25, 2019, DOI: 10.7500/AEPS20190228003.

Notification to Grant Patent Right for Invention in counterpart China Application No. 202010109315.5, dated Sep. 3, 2021.

* cited by examiner

HEAT SUPPLY NETWORK HYDRAULIC CIRCUIT MODELING METHOD FOR COMPREHENSIVE ENERGY SYSTEM SCHEDULING

CROSS-REFERENCES TO RELATED APPLICATIONS

This application is a continuation of International Application No. PCT/CN2021/070697, filed on Jan. 7, 2021, which is based on and claims priority to Chinese Patent Application No. 202010109315.5, filed on Feb. 22, 2020, titled "HEAT SUPPLY NETWORK HYDRAULIC CIRCUIT MODELING METHOD FOR COMPREHENSIVE ENERGY SYSTEM SCHEDULING", the entire disclosure of which is incorporated herein by reference.

FIELD

The present disclosure relates to a heat supply network hydraulic circuit modeling method for a comprehensive energy system scheduling, and belongs to the technical field of operation control of the comprehensive energy system.

BACKGROUND

Combined heat and power system, as a typical representative of comprehensive energy system, can give full play to the coupling characteristics of heating power and electric power and improve the comprehensive energy utilization efficiency, which has received extensive attention and research by scholars at home and abroad. At present, a series of applications such as thermoelectric coupling flow calculation, thermoelectric coupling economic dispatch, thermoelectric coupling planning, and thermoelectric coupling state estimation have been developed, all of which are based on the modeling and analysis of electric power network and heat supply network. The analysis of the electric power network based on the circuit theory has formed a mature alternate current power flow model and a direct current power flow model, while the heat supply network has not yet formed a unified theory and model. For the hydraulic analysis of the heat supply network, the steady modeling method is generally used in engineering, which separates the connection between the hydraulic dynamic state and the hydraulic steady state, and has the problem of unclear physical meaning.

SUMMARY

The purpose of the present disclosure is to propose a heat supply network hydraulic circuit modeling method for a comprehensive energy system scheduling, which unifies the hydraulic analysis model of the heat supply network and the power network model in the comprehensive energy system, and establishes the connection between the hydraulic dynamic state and the hydraulic steady state to complete the degradation of the dynamic hydraulic network equation to the steady state hydraulic network equation.

The heat supply network hydraulic circuit modeling method for the comprehensive energy system proposed in the present disclosure includes the following steps.

Step 1 of establishing a device model for a heat supply network, includes:

step 1-1 of establishing a thermal pipeline model in the heat supply network, including:

step 1-1-1 of establishing a mass conservation equation and a momentum conservation equation describing a one-dimensional flow process of water in the thermal pipeline:

$$\frac{\partial\rho}{\partial t}+\frac{\partial\rho v}{\partial x}=0,\text{ and }\frac{\partial\rho v}{\partial t}+\frac{\partial\rho v^2}{\partial x}+\frac{\partial p}{\partial x}+\frac{\lambda\rho v^2}{2D}+\rho g\sin\theta=0,$$

where ρ, ν and p denote a density, a flow rate and a pressure of the water, respectively, λ, D and θ denote a friction coefficient, an inner diameter and an inclination angle of the thermal pipeline, respectively, g denotes an acceleration of gravity, and t and x denote time and space, respectively;

step 1-1-2 of establishing, based on a fact that the water is an incompressible fluid, a differential equation of the density of the water about the time and the space:

$$\frac{\partial\rho}{\partial t}=\frac{\partial\rho}{\partial x}=0;$$

step 1-1-3 of ignoring the convection term $$\frac{\partial\rho v^2}{\partial x}$$

in the momentum conservation equation in the step 1-1-1, that is $$\frac{\partial\rho v^2}{\partial x}\approx 0,$$

and performing an incremental linearization approximation on the square term of the flow rate in the resistance term $$\frac{\lambda\rho v^2}{2D},$$

that is, letting $v^2\approx 2v_{base}v-v_{base}{}^2$, where $v_{base}$ denotes a base value of the flow rate of the water in the thermal pipeline, taking a flow rate in a design condition;

step 1-1-4 of substituting the steps 1-1-2 and 1-1-3 into the step 1-1-1 to get following equations:

$$\frac{\partial G}{\partial x}=0,\text{ and }\frac{1}{A}\frac{\partial G}{\partial t}+\frac{\partial p}{\partial x}+\frac{\lambda G_{base}}{\rho A^2 D}G-\frac{\lambda G_{base}^2}{2\rho A^2 D}+\rho g\sin\theta=0,$$

where G denotes a mass flow of the water, G=ρνA, A denotes a cross-sectional area of the thermal pipeline, and $G_{base}$ denotes a base value of the mass flow corresponding to the base value of the flow rate, that is $G_{base}=\rho v_{base}{}^{A}$;

step 1-1-5 of establishing, based on the step 1-1-4, equations of a flow difference and a pressure drop at both ends of a micro-element dx of the thermal pipeline:

dG=0 , and $$dp=-\frac{dx}{A}\cdot\frac{dG}{dt}-\frac{\lambda G_{base}dx}{\rho A^2 D}G-\left(\rho g\sin\theta-\frac{\lambda G_{base}^2}{2\rho A^2 D}\right)dx,$$

where dG denotes the flow difference at both ends of the micro-element of the thermal pipeline, and dp denotes the pressure drop at both ends of the micro-element of the thermal pipeline;

step 1-1-6 of obtaining, based on the equations of the flow difference and the pressure drop at both ends of the micro-element of the thermal pipeline in the step 1-1-5, calculation equations of a hydraulic resistance $R_h$, a hydraulic inductance $L_h$ and a hydraulic pressure source $E_h$ in the thermal pipeline as follows:

$$R_h = \lambda G_{base}/(\rho A^2 D),$$

$$L_h = 1/A, \text{ and}$$

$$E_h = \rho g \sin\theta - \lambda G_{base}^2/(2\rho A^2 D),$$

where the micro-element dx of the thermal pipeline denotes a hydraulic circuit including 3 elements, and the entire thermal pipeline denotes a distributed parameter hydraulic circuit;

step 1-1-7 of establishing, based on element parameters of the distribution parameter hydraulic circuit of the thermal pipeline in the step 1-1-6, element parameters of a lumped parameter hydraulic circuit of the thermal pipeline:

$$R = R_h l,$$

$$L = L_h l, \text{ and}$$

$$E = E_h l,$$

where R denotes a hydraulic resistance in the lumped parameter hydraulic circuit of the thermal pipeline, L denotes a hydraulic inductance in the lumped parameter hydraulic circuit of the thermal pipeline, E denotes a hydraulic pressure source in the lumped parameter hydraulic circuit of the thermal pipeline, and l denotes a length of the thermal pipeline;

step 1-1-8 of performing Fourier transform on an excitation of the lumped parameter hydraulic circuit of the thermal pipeline, decomposing the excitation of the lumped parameter hydraulic circuit of the thermal pipeline into a plurality of sinusoidal steady state excitations at different frequencies, and establishing algebraic equations of a lumped parameter frequency domain hydraulic circuit corresponding to each frequency component ω in the sinusoidal steady state excitation:

$$p_l = p_0 - (R - j\omega L)G_0 - E, \text{ and}$$

$$G_l = G_0,$$

where $P_0$ and $G_0$ denote a pressure and a flow at a head end of the thermal pipeline, respectively, and $p_1$ and $G_1$ denote a pressure and a flow at a terminal end of the thermal pipeline;

step 1-2 of establishing a flow control valve model in the heat supply network, including:

step 1-2-1 of establishing an equation between a pressure difference p on both sides of the flow control valve and a mass flow G of the flow control valve:

$$p = k_v G^2,$$

where $k_v$denotes an opening coefficient of the flow control valve, and G denotes the mass flow of the water;

step 1-2-2 of performing an incremental linearization approximation on the square term $G^2$ of the mass flow in the step 1-2-1, that is $G^2=2G_{base}G-G_{base}^2$, and converting the equation between the pressure difference P on both sides of the flow control valve and the mass flow G of the flow control valve in the step 1-2-1 into the following equation:

$$p = 2k_v G_{baee} \cdot G - k_v G_{base}^2,$$

step 1-2-3 of defining, based on the step 1-2-2, calculation equations of a hydraulic resistance $R_v$ and a hydraulic pressure source $E_v$ of the flow control valve as follows:

$$R_v = 2k_v G_{base}, \text{ and}$$

$$E_v = -k_v G_{base}^2;$$

step 1-3 of establishing a compressor model in the heat supply network, including:

step 1-3-1 of establishing an equation between a pressure difference p on both sides of the compressor and a mass flow G of the water of the compressor at a given rotation speed:

$$p = -(k_{p1}G^2 + k_{p2}\omega_p G + k_{p3}\omega_p^2),$$

where $k_{p1}$, $k_{p2}$ and $k_{p3}$ denote inherent coefficients of the compressor, which are obtained from a factory nameplate of the compressor or obtained through an external characteristic testing and fitting, and $\omega_p$ denotes a rotation frequency of the compressor;

step 1-3-2 of performing an incremental linearization approximation on the square term $G^2$ of the mass flow in the step 1-3-1, that is $G^2=2G_{base}G-G_{base}^2$, and converting the step 1-3-1 into following equation:

$$p = -(2k_{p1}G_{base} + k_{p2}\omega_p) \cdot G - (k_{p3}\omega_p^2 - k_{p1}G_{base}^2);$$

step 1-3-3 of defining, based on the step 1-3-2, calculation equations of a hydraulic resistance $R_p$ and a hydraulic pressure source $E_p$ of the compressor as follows:

$$R_p = -(2k_{p1}G_{base} + k_{p2}\omega_p), \text{ and}$$

$$E_p = k_{p1}G_{base}^2 - k_{p3}\omega_p^2.$$

Step 2 of establishing a hydraulic branch characteristic of the heat supply network includes:

step 2-1 of establishing, based on the models of the thermal pipeline, the flow control valve and the compressor established in the step 1, a hydraulic branch characteristic equation of the heat supply network:

$$G_b = y_b(p_b - E_b),$$

where $G_b$ denotes a base value of a mass flow corresponding to a base value of a flow rate in a hydraulic branch, $p_b$ denotes a hydraulic pressure difference at both ends of the hydraulic branch, $y_b$ denotes a branch admittance formed by a hydraulic resistance and a hydraulic inductance in the hydraulic branch, and $E_b$ denotes a sum of hydraulic pressure sources in the hydraulic branch;

step 2-2 of writing hydraulic branch equations of all the hydraulic branches in the heat supply network into a matrix form as follows:

$$G_b = y_b(p_b - E_b),$$

where $G_b$, $p_b$ and $E_b$ denote a column vector composed of the mass flow of the water in all the hydraulic branches in the heat supply network, a column vector composed of the hydraulic pressure difference at both ends of each branch in all the hydraulic branches in the heat supply network, and a column vector composed of the hydraulic pressure sources in all the hydraulic branches in the heat supply network, respectively, and $y_b$ denotes a diagonal matrix composed of the admittances of all the branches of the heat supply network.

Step 3 of establishing hydraulic topology constraints of the heat supply network includes:

step 3-1 of defining a node-branch correlation matrix $A_h$ in the heat supply network, which is a matrix of n rows and m columns, where n denotes a number of nodes in the heat supply network, and m denotes a number of branches in the heat supply network $(A_h)_{i,j}$ denotes an element in an $i^{th}$ row and a $j^{th}$ column in $(A_h)_{i,j}$, $(A_h)_{i,j}=0$ denotes that the) branch j is not connected to the node i, $(A_h)_{i,j}=1$ denotes that the branch flows out from the node i , and $(A_h)_{i,j}{}^{=-1}$ denotes that the branch flows into the node i;

step 3-2 of establishing, based on Kirchhoff-like current law, a mass conservation equation of nodes of the heat supply network:

$$A_h G_b = G_n,$$

where $G_n$ denotes a column vector formed by water injection of each node, and when the heat supply network is a closed network, then $G_n=0$;

step 3-3 of establishing, based on Kirchhoff-like voltage law, a loop pressure drop equation of the heat supply network:

$$A_h^T p_n = p_b,$$

where $p_n$ denotes a column vector composed of a hydraulic pressure value of each node.

Step 4 of establishing a dynamic hydraulic network equation of the heat supply network includes:

step 4-1 of substituting the hydraulic topology constraints established in the steps 3-2 and 3-3 into the branch characteristic equation established in the step 2-2 and obtaining an unreduced form of a hydraulic network equation of the heat supply network as follows:

$$A_h y_b A_h^T p_n = G_n + A_h y_b E_b, ;$$

step 4-2 of defining a generalized node admittance matrix $Y_h$ and a generalized node injection vector $G'_n$ as follows:

$$Y_h = A_h y_b A_h^T, \text{ and}$$

$$G_n' = G_n + A_h y_b E_b;$$

step 4-3 of substituting the $Y_h$ and $$G_n'$$

defined in the step 4-2 into the unreduced form of the hydraulic network equation of the heat supply network in the step 4-1, and obtaining the hydraulic network equation in the heat supply network of following form:

$$Y_h p_n = G_n',$$

where the above hydraulic network equation describes a hydraulic dynamic of the heat supply network.

Step 5 of deleting a hydraulic inductance element in the hydraulic circuit model of the heat supply network, recalculating, based on the step 4, the generalized node admittance matrix $Y^h$, and only taking a zero-frequency component in a frequency domain to degenerate the dynamic hydraulic circuit model into a steady hydraulic circuit model, is provided. The steady hydraulic circuit model is the heat supply network hydraulic circuit model for the comprehensive energy system control.

The advantages of the heat supply network hydraulic circuit modeling method for the comprehensive energy system scheduling proposed in the present disclosure are as follows.

The heat supply network hydraulic circuit modeling method for the comprehensive energy system scheduling of the present disclosure unifies the hydraulic analysis model of the heat supply network with the power network model in the comprehensive energy system, and establishes the connection between the hydraulic dynamic state and the hydraulic steady state. The method of the present disclosure is based on the characteristic equations of thermal pipelines, flow control valves and compressors, abstracts hydraulic circuit element models such as hydraulic resistance, hydraulic inductance and hydraulic pressure source, establishes hydraulic branch characteristics of the heat supply network based on the above hydraulic circuit elements, establishes the hydraulic topology constraints of the heat supply network based on Kirchhoff-like voltage and current laws, and establishes the dynamic hydraulic network equation of the heat supply network (that is, the dynamic hydraulic circuit model of the heat supply network) by combining the above hydraulic branch characteristics and hydraulic topology constraints, to complete the degradation of the dynamic hydraulic network equation to the steady hydraulic network equation. The method of the present disclosure has a clear physical meaning, covers various equipment such as thermal pipelines, flow control valves and compressors, comprehensively considers branch characteristics and topology constraints of the heat supply network, and the modeling method has strong applicability. At the same time, by abstracting hydraulic circuit elements such as hydraulic resistance, hydraulic inductance and hydraulic pressure source, the hydraulic circuit model of the heat supply network and the power network model are highly unified in mathematical form. Therefore, the method of the present disclosure is conducive to the unified scheduling of both thermal and electrical heterogeneous energy flow systems.

BRIEF DESCRIPTION OF DRAWINGS

FIGS. 1*a* and 1*b* show schematic diagrams of a distributed parameter hydraulic circuit of a thermal pipeline involved in a method of the present disclosure, wherein FIG. 1*a* is the distributed parameter hydraulic circuit of the entire thermal pipeline, and FIG. 1*b* is a distributed parameter hydraulic circuit of a micro-element with a dx length in the thermal pipeline.

DESCRIPTION OF EMBODIMENTS

Figure 1A:
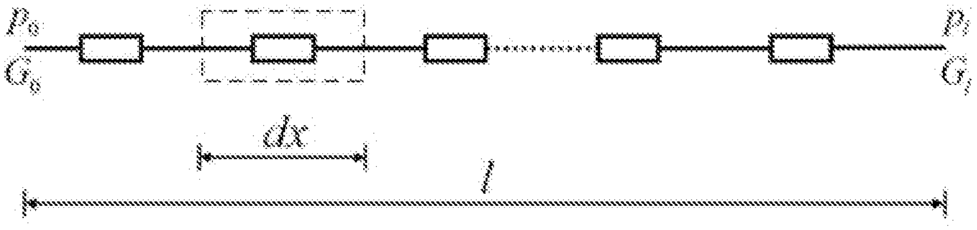
Figure 1B:
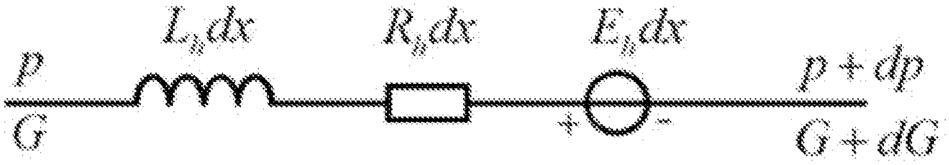
Figure 2:
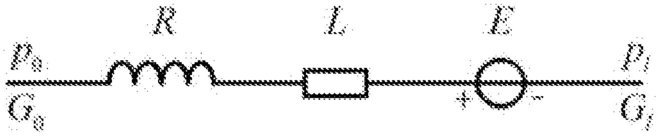
FIG. 2 is a schematic diagram of a lumped parameter equivalent hydraulic circuit of a thermal pipeline.

A heat supply network hydraulic circuit modeling method for a comprehensive energy system control proposed in the present disclosure includes the following steps:

step 1 of establishing a device model for a heat supply network, including:

step 1-1 of establishing a thermal pipeline model in the heat supply network, including:

step 1-1-1 of establishing a mass conservation equation and a momentum conservation equation describing a one-dimensional flow process of water in the thermal pipeline:

$$\frac{\partial \rho}{\partial t}+\frac{\partial \rho v}{\partial x}=0,\text{ and }\frac{\partial \rho v}{\partial t}+\frac{\partial \rho v^2}{\partial x}+\frac{\partial p}{\partial x}+\frac{\lambda \rho v^2}{2D}+\rho g\sin\theta=0,$$

where ρ, ν and p denote a density, a flow rate and a pressure of the water, respectively, λ, D and θ denote a friction coefficient, an inner diameter and an inclination angle of the thermal pipeline, respectively, g denotes an acceleration of gravity, and t and x denote time and space, respectively;

step 1-1-2 of establishing, based on a fact that the water is an incompressible fluid, a differential equation of the density of the water about the time and the space:

$$\frac{\partial \rho}{\partial t}=\frac{\partial \rho}{\partial x}=0;$$

step 1-1-3 of ignoring the convection term $$\frac{\partial \rho v^2}{\partial x}$$

in the momentum conservation equation in the step 1-1-1, that is $$\frac{\partial \rho v^2}{\partial x}\approx 0,$$

and performing an incremental linearization approximation on the square term of the flow rate in the resistance term $$\frac{\lambda \rho v^2}{2D},$$

that is, letting $v^2 \approx 2v_{base}v - v_{base}^2$, where $v_{base}$ denotes a base value of the flow rate of the water in the thermal pipeline, taking a flow rate in a design condition;

step 1-1-4 of substituting the steps 1-1-2 and 1-1-3 into the step 1-1-1 to get following equations:

$$\frac{\partial G}{\partial x}=0,\text{ and }\frac{1}{A}\frac{\partial G}{\partial t}+\frac{\partial p}{\partial x}+\frac{\lambda G_{base}}{\rho A^2 D}G-\frac{\lambda G_{base}^2}{2\rho A^2 D}+\rho g\sin\theta=0,$$

where G denotes a mass flow of the water, G=ρνA, A denotes a cross-sectional area of the thermal pipeline, and $G_{base}$ denotes a base value of the mass flow corresponding to the base value of the flow rate, that is $G_{base}=\rho v_{base}{}^{A}$;

step 1-1-5 of establishing, based on the step 1-1-4, equations of a flow difference and a pressure drop at both ends of a micro-element dx of the thermal pipeline:

$$dG=0,\text{ and }dp=-\frac{dx}{A}\cdot\frac{dG}{dt}-\frac{\lambda G_{base}dx}{\rho A^2 D}G-\left(\rho g\sin\theta-\frac{\lambda G_{base}^2}{2\rho A^2 D}\right)dx,$$

where dG denotes the flow difference at both ends of the micro-element of the thermal pipeline, and dp denotes the pressure drop at both ends of the micro-element of the thermal pipeline;

step 1-1-6 of obtaining, based on the equations of the flow difference and the pressure drop at both ends of the micro-element of the thermal pipeline in the step 1-1-5, calculation equations of a hydraulic resistance $R_h$, a hydraulic inductance $L_h$ and a hydraulic pressure source $E_h$ in the thermal pipeline as follows:

$$R_h=\lambda G_{base}/(\rho A^2 D),$$

$$L_h=1/A,\text{ and}$$

$$E_h=\rho g\sin\theta-\lambda G_{base}^2/(2\rho A^2 D),$$

where the micro-element of the thermal pipeline denotes a hydraulic circuit including 3 elements, and the entire thermal pipeline denotes a distributed parameter hydraulic circuit, and the distributed parameter hydraulic circuit of the entire thermal pipeline and the distributed parameter hydraulic circuit of the micro-element dx of the thermal pipeline are shown in FIGS. 1*a* and 1*b*;

step 1-1-7 of establishing, based on element parameters of the distribution parameter hydraulic circuit of the thermal pipeline in the step 1-1-6, element parameters of a lumped parameter hydraulic circuit of the thermal pipeline, where the lumped parameter hydraulic circuit of the thermal pipeline is shown in FIG. 2:

$$R = R_h l,$$

$$L = L_h l, \text{ and}$$

$$E = E_h l,$$

where R denotes a hydraulic resistance in the lumped parameter hydraulic circuit of the thermal pipeline, L denotes a hydraulic inductance in the lumped parameter hydraulic circuit of the thermal pipeline, E denotes a hydraulic pressure source in the lumped parameter hydraulic circuit of the thermal pipeline, and l denotes a length of the thermal pipeline;

step 1-1-8 of performing Fourier transform on an excitation of the lumped parameter hydraulic circuit of the thermal pipeline, decomposing the excitation of the lumped parameter hydraulic circuit of the thermal pipeline into a plurality of sinusoidal steady state excitations at different frequencies, and establishing algebraic equations of a lumped parameter frequency domain hydraulic circuit corresponding to each frequency component ω in the sinusoidal steady state excitation:

$$p_l = p_0 - (R + j\omega L)G_0 - E, \text{ and}$$

$$G_l = G_0,$$

where $p_0$ and $G_0$ denote a pressure and a flow at a head end of the thermal pipeline, respectively, and $p_l$ and $G_l$ denote a pressure and a flow at a terminal end of the thermal pipeline;

step 1-2 of establishing a flow control valve model in the heat supply network, including:

step 1-2-1 of establishing an equation between a pressure difference P on both sides of the flow control valve and a mass flow G of the flow control valve:

$$p = k_v G^2,$$

where $k_v$ denotes an opening coefficient of the flow control valve, and G denotes the mass flow of the water;

step 1-2-2 of performing an incremental linearization approximation on the square term $G^2$ of the mass flow in the step 1-2-1, that is $G^2=2G_{base}G-G_{base}{}^2$, and converting the equation between the pressure difference p on both sides of the flow control valve and the mass flow G of the flow control valve in the step 1-2-1 into the following equation:

$$p = 2k_v G_{base} \cdot G - k_v G_{base}^2,$$

step 1-2-3 of defining, based on the step 1-2-2, calculation equations of a hydraulic resistance $R_v$ and a hydraulic pressure source $E_v$ of the flow control valve as follows:

$$R_v = 2k_v G_{base}, \text{ and}$$

$$E_v = -k_v G_{base}^2;$$

step 1-3 of establishing a compressor model in the heat supply network, including:

step 1-3-1 of establishing an equation between a pressure difference p on both sides of the compressor and a mass flow G of the water of the compressor at a given rotation speed:

$$p = -\left(k_{\rho1} G^2 + k_{\rho2}\omega_\rho G + k_{\rho3}\omega_\rho^2\right),$$

where $k_{p1}$, $k_{p2}$ and $k_{p3}$ denote inherent coefficients of the compressor, which are obtained from a factory nameplate of the compressor or obtained through an external characteristic testing and fitting, and $\omega_p$ denotes a rotation frequency of the compressor;

step 1-3-2 of performing an incremental linearization approximation on the square term $G^2$ of the mass flow in the step 1-3-1, that is $G^2=2G_{base}G-G_{base}{}^2$, and converting the step 1-3-1 into following equation:

$$p = -(2k_{\rho1} G_{base} + k_{\rho2}\omega_\rho) \cdot G - \left(k_{\rho3}\omega_\rho^2 - k_{\rho1} G_{base}^2\right);$$

step 1-3-3 of defining, based on the step 1-3-2, calculation equations of a hydraulic resistance $R_p$ and a hydraulic pressure source $E_p$ of the compressor as follows:

$$R_p = -(2k_{p1}G_{base} + k_{p2}\omega_p), \text{ and}$$

$$E_p = k_{\rho1} G_{base}^2 - k_{\rho3}\omega_\rho^2;$$

step 2 of establishing a hydraulic branch characteristic of the heat supply network, including:

step 2-1 of establishing, based on the models of the thermal pipeline, the flow control valve and the compressor established in the step 1, a hydraulic branch characteristic equation of the heat supply network:

$$G_b = y_b(p_b - E_b),$$

where $G_b$ denotes a base value of a mass flow corresponding to a base value of a flow rate in a hydraulic branch, $p_b$ denotes a hydraulic pressure difference at both ends of the hydraulic branch, $y_b$ denotes a branch admittance formed by a hydraulic resistance and a hydraulic inductance in the hydraulic branch, and $E_b$ denotes a sum of hydraulic pressure sources in the hydraulic branch;

step 2-2 of writing hydraulic branch equations of all the hydraulic branches in the heat supply network into a matrix form as follows:

$$G_b = y_b(p_b - E_b),$$

where $G_b$, $p_b$ and $E_b$ denote a column vector composed of the mass flow of the water in all the hydraulic branches in the heat supply network, a column vector composed of the hydraulic pressure difference at both ends of each branch in all the hydraulic branches in the heat supply network, and a column vector composed of the hydraulic pressure sources in all the hydraulic branches in the heat supply network, respectively, and $y_b$ denotes a diagonal matrix composed of the admittances of all the branches of the heat supply network;

step 3 of establishing hydraulic topology constraints of the heat supply network, including:

step 3-1 of defining a node-branch correlation matrix $A_h$ in the heat supply network, which is a matrix of n rows and m columns, where n denotes a number of nodes in the heat supply network, and m denotes a number of branches in the heat supply network, $(A_h)_{i,j}$ denotes an element in an $i^{th}$ row and a $j^{th}$ column in $(A_h)_{i,j}$, $(A_h)_{i,j}=0$ denotes that the branch j is not connected to the node i, $(A_h)_{i,j}=1$ denotes that the branch flows out from the node i, and $(A_h)_{i,j}=-1$ denotes that the branch flows into the node i;

step 3-2 of establishing, based on Kirchhoff-like current law, a mass conservation equation of nodes of the heat supply network:

$$A_h G_b = G_n,$$

where $G_n$ denotes a column vector formed by water injection of each node, and when the heat supply network is a closed network, then $G_n=0$;

step 3-3 of establishing, based on Kirchhoff-like voltage law, a loop pressure drop equation of the heat supply network:

$$A_h^T p_n = p_b,$$

where $p_n$ denotes a column vector composed of a hydraulic pressure value of each node;

step 4 of establishing a dynamic hydraulic network equation of the heat supply network, including:

step 4-1 of substituting the hydraulic topology constraints established in the steps 3-2 and 3-3 into the branch characteristic equation established in the step 2-2 and obtaining an unreduced form of a hydraulic network equation of the heat supply network as follows:

$$A_h y_b A_h^T p_n = G_n + A_h y_b E_b;$$

step 4-2 of defining a generalized node admittance matrix $Y_h$ and a generalized node injection vector $$G'_n$$

as follows:

$$Y_h = A_h y_b A_h^T$$

and $$G'_n = G_n + A_h y_b E_b;$$

$$G'_n$$

defined in the step 4-2 into the unreduced form of the hydraulic network equation of the heat supply network in the step 4-1, and obtaining the hydraulic network equation in the heat supply network of following form:

$$Y_h p_n = G'_n,$$

where the above hydraulic network equation describes a hydraulic dynamic of the heat supply network, and has a unified form with the network equation of the power network;

step 5 of deleting a hydraulic inductance element in the hydraulic circuit model of the heat supply network, recalculating, based on the step 4, the generalized node admittance matrix $Y_h$, and only taking a zero-frequency component in a frequency domain to degenerate the dynamic hydraulic circuit model into a steady hydraulic circuit model. When the transient hydraulic dynamic process does not need to be considered, the steady hydraulic circuit model can be used as the heat supply network hydraulic circuit model for the comprehensive energy system control.

What is claimed is:

1. A control apparatus for a comprehensive energy system, the comprehensive energy system comprising a heat supply network, and the control apparatus comprising a processor and a memory storing computer-executable instructions thereon, wherein the computer-executable instructions, when executed by the processor, cause the control apparatus to perform:

step 1 of establishing a device model for a heat supply network, comprising:

step 1-1 of establishing a thermal pipeline model in the heat supply network, comprising:

step 1-1-1 of establishing a mass conservation equation and a momentum conservation equation describing a one-dimensional flow process of water in the thermal pipeline:

$$\frac{\partial \rho}{\partial t} + \frac{\partial \rho v}{\partial x} = 0, \text{ and } \frac{\partial \rho v}{\partial t} + \frac{\partial \rho v^2}{\partial x} + \frac{\partial p}{\partial x} + \frac{\lambda \rho v^2}{2D} + \rho g \sin\theta = 0,$$

where ρ, v and p denote a density, a flow rate and a pressure of the water, respectively, λ, D and θ denote a friction coefficient, an inner diameter and an inclination angle of the thermal pipeline, respectively, g denotes an acceleration of gravity, and t and x denote time and space, respectively;

step 1-1-2 of establishing, based on a fact that the water is an incompressible fluid, a differential equation of the density of the water about the time and the space:

$$\frac{\partial \rho}{\partial t} = \frac{\partial \rho}{\partial x} = 0;$$

step 1-1-3 of ignoring the convection term $$\frac{\partial \rho v^2}{\partial x}$$

in the momentum conservation equation in the step 1-1-1, that is $$\frac{\partial \rho v^2}{\partial x} \approx 0,$$

and performing an incremental linearization approximation on the square term of the flow rate in the resistance term $$\frac{\lambda \rho v^2}{2D},$$

that is, letting $v^2 \approx 2v_{base}v - v_{base}^2$, where $v_{base}$ denotes a base value of the flow rate of the water in the thermal pipeline, taking a flow rate in a design condition;

step 1-1-4 of substituting the steps 1-1-2 and 1-1-3 into the step 1-1-1 to get following equations:

$$\frac{\partial G}{\partial x} = 0, \text{ and } \frac{1}{A}\frac{\partial G}{\partial t} + \frac{\partial p}{\partial x} + \frac{\lambda G_{base}}{\rho A^2 D}G - \frac{\lambda G_{base}^2}{2\rho A^2 D} + \rho g \sin\theta = 0,$$

where G denotes a mass flow of the water, $G=\rho vA$ denotes a cross-sectional area of the thermal pipeline, and $G_{base}$ denotes a base value of the mass flow corresponding to the base value of the flow rate, that is $G_{base}=\rho v_{base}A$;

step 1-1-5 of establishing, based on the step 1-1-4, equations of a flow difference and a pressure drop at both ends of a micro-element dx of the thermal pipeline:

$$dG = 0, \text{ and } dp = -\frac{dx}{A} \cdot \frac{dG}{dt} - \frac{\lambda G_{base} dx}{\rho A^2 D}G - \left(\rho g \sin\theta - \frac{\lambda G_{base}^2}{2\rho A^2 D}\right)dx,$$

where dG denotes the flow difference at both ends of the micro-element of the thermal pipeline, and dp denotes the pressure drop at both ends of the micro-element of the thermal pipeline;

step 1-1-6 of obtaining, based on the equations of the flow difference and the pressure drop at both ends of the micro-element of the thermal pipeline in the step 1-1-5, calculation equations of a hydraulic resistance $R_h$, a hydraulic inductance $L_h$ and a hydraulic pressure source $E_h$ in the thermal pipeline as follows:

$$R_h = \lambda G_{base}/(\rho A^2 D),$$

$$L_h = 1/A, \text{ and}$$

$$E_h = \rho g \sin\theta - \lambda G_{base}^2/(2\rho A^2 D),$$

wherein the micro-element dx of the thermal pipeline denotes a hydraulic circuit comprising 3 elements, and the entire thermal pipeline denotes a distributed parameter hydraulic circuit;

step 1-1-7 of establishing, based on element parameters of the distributed parameter hydraulic circuit of the thermal pipeline in the step 1-1-6, element parameters of a lumped parameter hydraulic circuit of the thermal pipeline:

$$R = R_h l,$$

$$L = L_h l, \text{ and}$$

$$E = E_h l,$$

where R denotes a hydraulic resistance in the lumped parameter hydraulic circuit of the thermal pipeline, L denotes a hydraulic inductance in the lumped parameter hydraulic circuit of the thermal pipeline, E denotes a hydraulic pressure source in the lumped parameter hydraulic circuit of the thermal pipeline, and l denotes a length of the thermal pipeline;

step 1-1-8 of performing Fourier transform on an excitation of the lumped parameter hydraulic circuit of the thermal pipeline, decomposing the excitation of the lumped parameter hydraulic circuit of the thermal pipeline into a plurality of sinusoidal steady state excitations at different frequencies, and establishing algebraic equations of a lumped parameter frequency domain hydraulic circuit corresponding to each frequency component ω in the sinusoidal steady state excitation:

$$p_l = p_0 - (R + j\omega L)G_0 - E, \text{ and}$$

$$G_l = G_0,$$

where $p_0$ and $G_0$ denote a pressure and a flow at a head end of the thermal pipeline, respectively, and $p_1$, and $G_1$, denote a pressure and a flow at a terminal end of the thermal pipeline;

step 1-2 of establishing a flow control valve model in the heat supply network, comprising:

step 1-2-1 of establishing an equation between a pressure difference p on both sides of the flow control valve and a mass flow G of the flow control valve:

$$p = k_v G^2,$$

where k, denotes an opening coefficient of the flow control valve, and G denotes the mass flow of the water;

step 1-2-2 of performing an incremental linearization approximation on the square term $G^2$ of the mass flow in the step 1-2-1, that is $G^2=2G_{base}G-G_{base}^2$, and converting the equation between the pressure difference p on both sides of the flow control valve and the mass flow G of the flow control valve in the step 1-2-1 into the following equation:

$$p = 2k_v G_{base} \cdot G - k_v G_{base}^2,$$

step 1-2-3 of defining, based on the step 1-2-2, calculation equations of a hydraulic resistance $R_v$ and a hydraulic pressure source $E_v$ of the flow control valve as follows:

$$R_v = 2k_v G_{base}, \text{ and}$$

$$E_v = -k_v G_{base}^2;$$

step 1-3 of establishing a compressor model in the heat supply network, comprising:

step 1-3-1 of establishing an equation between a pressure difference p on both sides of the compressor and a mass flow G of the water of the compressor at a given rotation speed:

$$p = -\left(k_{p1}G^2 + k_{p2}\omega_p G + k_{p3}\omega_p^2\right),$$

where $k_{p1}$, $k_{p2}$ and $k_{p3}$ denote inherent coefficients of the compressor, which are obtained from a factory nameplate of the compressor or obtained through an external characteristic testing and fitting, and $\omega_p$ denotes a rotation frequency of the compressor;

step 1-3-2 of performing an incremental linearization approximation on the square term $G^2$ of the mass flow in the step 1-3-1, that is $G^2=2G_{base}G-G_{base}^2$, and converting the step 1-3-1 into following equation:

$$p = -(2k_{p1}G_{base} + k_{p2}\omega_p)\cdot G - \left(k_{p3}\omega_p^2 - k_{p1}G_{base}^2\right);$$

step 1-3-3 of defining, based on the step 1-3-2, calculation equations of a hydraulic resistance $R_p$ and a hydraulic pressure source $E_p$ of the compressor as follows:

$$R_p = -(2k_{p1}G_{base} + k_{p2}\omega_p), \text{ and}$$

$$E_p = k_{p1}G_{base}^2 - k_{p3}\omega_p^2;$$

step 2 of establishing a hydraulic branch characteristic of the heat supply network, comprising:

step 2-1 of establishing, based on the models of the thermal pipeline, the flow control valve and the compressor established in the step 1, a hydraulic branch characteristic equation of the heat supply network:

$$G_b = y_b(p_b - E_b),$$

where $G_b$ denotes a base value of a mass flow corresponding to a base value of a flow rate in a hydraulic branch, $p_b$ denotes a hydraulic pressure difference at both ends of the hydraulic branch, $y_b$ denotes a branch admittance formed by a hydraulic resistance and a hydraulic inductance in the hydraulic branch, and $E_b$ denotes a sum of hydraulic pressure sources in the hydraulic branch;

step 2-2 of writing hydraulic branch equations of all the hydraulic branches in the heat supply network into a matrix form as follows:

$$G_b = y_b(p_b - E_b),$$

where $G_b$, $p_b$ and $E_b$ denote a column vector composed of the mass flow of the water in all the hydraulic branches in the heat supply network, a column vector composed of the hydraulic pressure difference at both ends of each branch in all the hydraulic branches in the heat supply network, and a column vector composed of the hydraulic pressure sources in all the hydraulic branches in the heat supply network, respectively, and $y_b$ denotes a diagonal matrix composed of the admittances of all the branches of the heat supply network;

step 3 of establishing hydraulic topology constraints of the heat supply network, comprising:

step 3-1 of defining a node-branch correlation matrix $A_h$ in the heat supply network, which is a matrix of n rows and m columns, where n denotes a number of nodes in the heat supply network, and m denotes a number of branches in the heat supply network, $(A_h)_{i,j}$ denotes an element in an $i^{th}$ row and a $j^{th}$ column in denotes that the branch j is not connected to the node i, $(A_h)_{i,j}=1$ denotes that the branch j flows out from the node i , and $(A_h)_{i,j}=-1$ denotes that the branch j flows into the node i;

step 3-2 of establishing, based on Kirchhoff-like current law, a mass conservation equation of nodes of the heat supply network:

$A_h G_b = G_n$, where $G_n$ denotes a column vector formed by water injection of each node, and when the heat supply network is a closed network, then $G_n=0$;

step 3-3 of establishing, based on Kirchhoff-like voltage law, a loop pressure drop equation of the heat supply network:

$$A_h^T p_n = p_b,$$

where $p_n$ denotes a column vector composed of a hydraulic pressure value of each node;

step 4 of establishing a dynamic hydraulic network equation of the heat supply network, comprising:

step 4-1 of substituting the hydraulic topology constraints established in the steps 3-2 and 3-3 into the branch characteristic equation established in the step 2-2 and obtaining an unreduced form of a hydraulic network equation of the heat supply network as follows:

$$A_h y_b A_h^T p_n = G_n + A_h y_b E_b;$$

step 4-2 of defining a generalized node admittance matrix $Y_h$ and a generalized node injection vector $$G_n'$$

as follows:

$$Y_h = A_h y_b A_h^T, \text{ and}$$

-continued $$G'_n = G_n + A_h y_b E_b;$$

step 4-3 of substituting the $Y_h$ and $$G'_n$$

defined in the step 4-2 into the unreduced form of the hydraulic network equation of the heat supply network in the step 4-1, and obtaining the hydraulic network equation in the heat supply network of following form:

$$Y_h p_n = G'_n,$$

wherein the above hydraulic network equation describes a hydraulic dynamic of the heat supply network;

step 5 of deleting a hydraulic inductance element in the hydraulic circuit model of the heat supply network, recalculating, based on the step 4, the generalized node admittance matrix $Y_h$, and only taking a zero-frequency component in a frequency domain to degenerate the dynamic hydraulic circuit model into a steady hydraulic circuit model, wherein the steady hydraulic circuit model is the heat supply network hydraulic circuit model for the comprehensive energy system control; and step 6 of controlling operation of the comprehensive energy system according to the heat supply network hydraulic circuit model, wherein the heat supply network comprises a flow control valve and a compressor, and wherein the controlling operation of the comprehensive energy system according to the heat supply network hydraulic circuit model, comprises:

adjusting an opening coefficient of the flow control valve and/or a rotation speed of the compressor, based on solution results of the heat supply network hydraulic circuit model.

* * * * *